United States Patent
Wolrath et al.

(10) Patent No.: US 11,118,660 B1
(45) Date of Patent: Sep. 14, 2021

(54) TRANSMISSION ARRANGEMENT WITH TORQUE VECTORING COMPRISING A COUPLED EPICYCLIC GEAR

(71) Applicant: Volvo Car Corporation, Gothenburg (SE)

(72) Inventors: Christian Wolrath, Trollhättan (SE); Erik Sten, Trollhättan (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/161,816

(22) Filed: Jan. 29, 2021

(30) Foreign Application Priority Data

Mar. 13, 2020 (EP) .................................... 20162901

(51) Int. Cl.
   *F16H 3/72* (2006.01)
   *B60K 17/12* (2006.01)
   *B60K 1/02* (2006.01)

(52) U.S. Cl.
   CPC ............... *F16H 3/728* (2013.01); *B60K 1/02* (2013.01); *B60K 17/12* (2013.01)

(58) Field of Classification Search
   CPC ................................ F16H 3/728; B60K 17/12
   See application file for complete search history.

(56) References Cited

U.S. PATENT DOCUMENTS

| | | | | |
|---|---|---|---|---|
| 7,892,128 B2 * | 2/2011 | Schondorf | ............... | B60K 6/40 475/5 |
| 8,125,095 B2 * | 2/2012 | Duffey | ...................... | F03D 9/25 290/44 |
| 8,585,533 B2 * | 11/2013 | Hwang | ..................... | F16H 3/72 475/219 |
| 8,784,257 B2 * | 7/2014 | Mattsson | ................ | F16H 3/725 475/207 |
| 8,920,274 B2 | 12/2014 | Scholz | | |
| 9,120,479 B2 | 9/2015 | Severinsson | | |
| 9,340,099 B2 * | 5/2016 | Hwang | ................... | F16H 3/006 |
| 9,768,714 B2 | 9/2017 | Allan | | |
| 10,030,755 B2 | 7/2018 | Severinsson et al. | | |

(Continued)

FOREIGN PATENT DOCUMENTS

DE   102006022175 A1   11/2007
DE   102007050704 A1   4/2009

(Continued)

OTHER PUBLICATIONS

May 5, 2020 European Search Report issued on International Application No. 20162901.

*Primary Examiner* — Tinh Dang
(74) *Attorney, Agent, or Firm* — Clements Bernard Walker; Christopher L. Bernard

(57) ABSTRACT

A transmission arrangement for an electric vehicle. The transmission arrangement includes a differential configured to connect a first electric machine to a first and second wheel via a respective first and second driveshaft. The transmission further includes a coupled epicyclic gear configured to connect a second electric machine to the first drive shaft via the coupled epicyclic gear. The transmission arrangement includes a coupled epicyclic gear using a single planet gear which meshes with two sun gears of different size, which can be compared to instead using a stepped planet gear including two planet gear portions of different size.

15 Claims, 3 Drawing Sheets

(56) References Cited

U.S. PATENT DOCUMENTS

| | | | | |
|---|---|---|---|---|
| 10,760,497 B2* | 9/2020 | Kobayashi | ............... | F02C 7/32 |
| 2006/0264296 A1* | 11/2006 | Moeller | ................. | F16H 3/728 |
| | | | | 475/275 |
| 2007/0287576 A1* | 12/2007 | Leneneu | ................. | B60K 6/50 |
| | | | | 475/332 |
| 2008/0227576 A1* | 9/2008 | Besnard | ................. | B60K 6/365 |
| | | | | 475/5 |
| 2012/0021865 A1* | 1/2012 | Hwang | ............... | F16H 37/0833 |
| | | | | 475/330 |
| 2018/0051788 A1 | 2/2018 | Gassman | | |
| 2018/0208048 A1 | 7/2018 | Morio et al. | | |

FOREIGN PATENT DOCUMENTS

| | | |
|---|---|---|
| DE | 102015103584 A1 | 9/2016 |
| DE | 102015223131 A1 | 5/2017 |
| WO | 201720706 A1 | 12/2017 |

\* cited by examiner

TRANSMISSION ARRANGEMENT WITH TORQUE VECTORING COMPRISING A COUPLED EPICYCLIC GEAR

CROSS-REFERENCE TO RELATED APPLICATION

The present disclosure claims the benefit of priority of co-pending European Patent Application No. 20162901.1, filed on Mar. 13, 2020, and entitled "TRANSMISSION ARRANGEMENT WITH TORQUE VECTORING COMPRISING A COUPLED EPICYCLIC GEAR," the contents of which are incorporated in full by reference herein.

TECHNICAL FIELD

The present disclosure relates to a transmission arrangement for an electric vehicle, the transmission arrangement including a coupled epicyclic gear and a differential for providing torque vectoring.

BACKGROUND

Torque vectoring is a transmission technology where a differential is arranged to transfer a variable torque to the wheels in a vehicle, thereby providing better handling of the vehicle as well as an active safety measure. In particular, torque vectoring can be used for correcting or reducing understeer or oversteer slide in a vehicle. Since electrical and hybrid vehicles may be heavier than comparable vehicles with a combustion engine, thereby becoming heavier and more difficult to steer, it is also desirable to provide torque vectoring in electrical and hybrid vehicles to improve the handling and agility.

Various types of known transmission arrangements including torque vectoring differentials may be used in an electrical or hybrid driveline. However, for a hybrid or electric vehicle it is particularly important to reach a low energy consumption, and there is thus room for improvement of existing transmission arrangements.

SUMMARY

In general, the disclosed subject matter relates to a transmission arrangement for an electric vehicle. The transmission arrangement includes a differential configured to connect a first electric machine to a first and second wheel via a respective first and second driveshaft. The first and second wheel may for example be the left and right rear wheels of the vehicle. The transmission further includes a coupled epicyclic gear configured to connect a second electric machine to the first drive shaft via the coupled epicyclic gear. A coupled epicyclic gear may also be referred to as a an epicyclic gear train or a planetary gear. The coupled epicyclic gear is further coupled to the differential.

The coupled epicyclic gear includes a planet carrier configured to be operatively connected to a second electric machine; a first sun gear including teeth having a first profile; a second sun gear including teeth having a second profile different from the first profile, wherein the number of teeth of the first sun gear is different from the number of teeth of the second sun gear; and at least one planet gear having a uniform tooth profile, wherein the planet gear is arranged and configured to simultaneously mesh with the first and the second sun gear.

The present disclosure is based on the realization that an improved coupled epicyclic gear can be achieved by using a single planet gear which meshes with two sun gears of different size, which can be compared to instead using a stepped planet gear including two planet gear portions of different size. There are several advantages of using a single planet gear, including a lower piece cost due to easier manufacturing compared to a stepped planet gear. Moreover, there will also be less load sharing error, and a single planet does not require complex gear timing during assembly of the coupled epicyclic gear. The coupled epicyclic gear may include a plurality of planet gears of the type described above. The number of planet gears to use in the coupled epicyclic gear can be selected based on the desired properties of the coupled epicyclic gear. More particularly, a higher number of planets leads to an increased torque transfer capacity. In other words, where the planet gear is referred to as a single planet gear, it does not relate to that number of planets in the coupled epicyclic gear, it instead refers to that one uniform, single, planet gear is simultaneously coupled to both the first and the second sun gear.

By means of the described transmission arrangement, electric true torque vectoring can be efficiently provided for both fully electric and hybrid vehicles.

In an embodiment of the disclosure, the planet gear consists of a single uniform gear element, thereby making it easier and less costly to manufacture. Moreover, the first and second sun gears are preferably helical gears having the same helix angle and the same helix direction, thereby facilitating simultaneous meshing of the two sun gears with the single planet gear.

According to one embodiment of the disclosure, the number of teeth of the first sun gear is smaller than the number of teeth of the second sun gear. For example, the number of teeth of the first sun gear is smaller than the number of teeth of the second sun gear by a number equal to a multiple of the number of planet gears. Moreover, the teeth of the first sun gear may be profile shifted with respect to the teeth of the second sun gear. In particular, the teeth of the first sun gear may have an addendum which is different from an addendum of the teeth of the second sun gear. Moreover, the teeth of the first sun gear may have a deeper profile compared to the teeth of the second sun gear.

DETAILED DESCRIPTION

In the present detailed description, various embodiments of the transmission arrangement according to the present disclosure are mainly discussed with reference to a transmission arrangement including a coupled epicyclic gear having three planet gears, and to a transmission arrangement configured to be connected to two electric machines to form a drive module for an electric or hybrid vehicle. It should be noted that this by no means limits the scope of the present disclosure which is equally applicable to a transmission arrangement used in other configurations and implementations.

Figure 1:
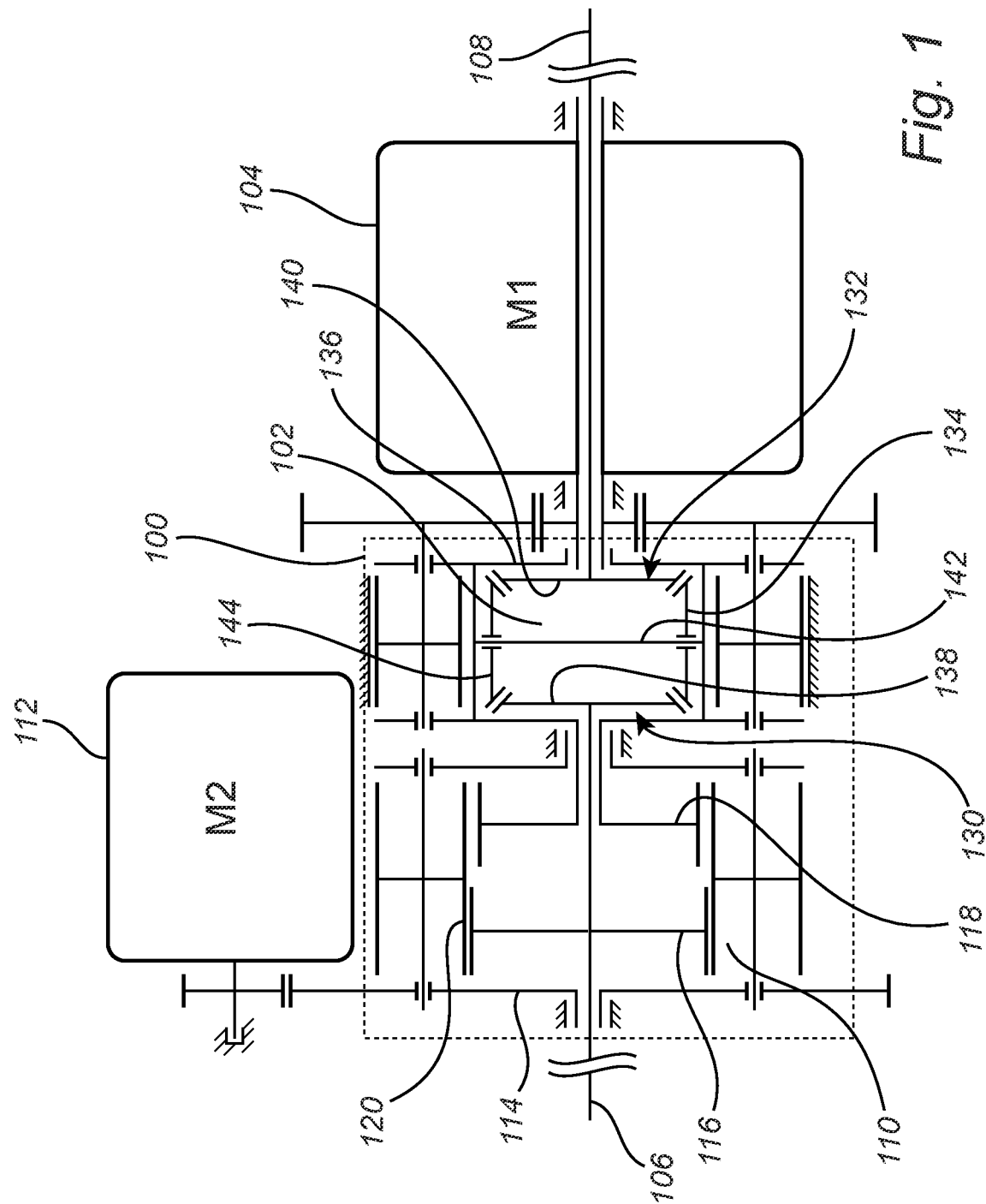
FIG. 1 is a schematic illustration of a drive module including a transmission arrangement according to an embodiment of the disclosure.

FIG. 1 is a schematic illustration of a drive module 101 including a transmission arrangement 100 for an electric vehicle according to an embodiment of the disclosure. The transmission arrangement includes a differential 102 configured to connect a first electric machine 104 to a first and second wheel via a corresponding first drive shaft 106 and second driveshaft 108. The drive module 101 may for example be arranged on a rear axle of a vehicle such that the first and second wheels are the left and right rear wheels of the vehicle.

The differential 102 of the transmission arrangement 100 includes a first differential output 130 and a second differential output 132. In the described example, the differential 102 includes a differential gear set 134 that is housed in the differential housing 136 and which has a first side gear 138, a second side gear 140, a cross-pin 142 and a plurality of pinion gears 144. The first and second side gears 138 and 140 can be rotatably disposed about a rotational axis of the differential housing 136 and can include the first and second differential outputs 130 and 132, respectively. The first drive shaft 106 is coupled to the first differential output 130 and the second drive shaft 108 is coupled to the second differential output 132. The cross-pin 142 can be mounted to the differential housing 136 generally perpendicular to the rotational axis of the differential housing 136. The pinion gears 144 can be rotatably mounted on the cross-pin 142 to mesh with the first and second side gears 138, 140. The differential housing 136 may also be referred to as the cage or case of the differential.

Even though a specific differential has been described herein, the skilled person realizes that the transmission arrangement equally well may be implemented using differentials having other configurations.

The transmission arrangement further includes a coupled epicyclic gear 110 configured to connect a second electric machine 112 to the first drive shaft 106 via the coupled epicyclic gear 110. In the described embodiment, the first electric machine 104 is configured to be the main source of electric propulsive power while the second electric machine 112 primarily is used during turning of the vehicle or when correction of the propulsion of the respective wheels is desired. Even though the described embodiments include electric machines, the transmission arrangement would work equally well with hydraulic machines.

The coupled epicyclic gear 110 includes: a planet carrier 114 configured to be operatively connected to the second electric machine; a first sun gear 116 including teeth having a first profile; a second sun gear 118 including teeth having a second profile different from the first profile, and wherein the number of teeth of the first sun gear 116 is different from the number of teeth of the second sun gear 118; and at least one planet gear 120 having a uniform teeth profile, wherein the planet gear 120 is arranged and configured to simultaneously mesh with the first and the second sun gears 116, 118.

Moreover, the first sun gear 116 is connected to the first drive shaft 106 and the second sun gear 118 is connected to the differential housing 136.

Figure 2:
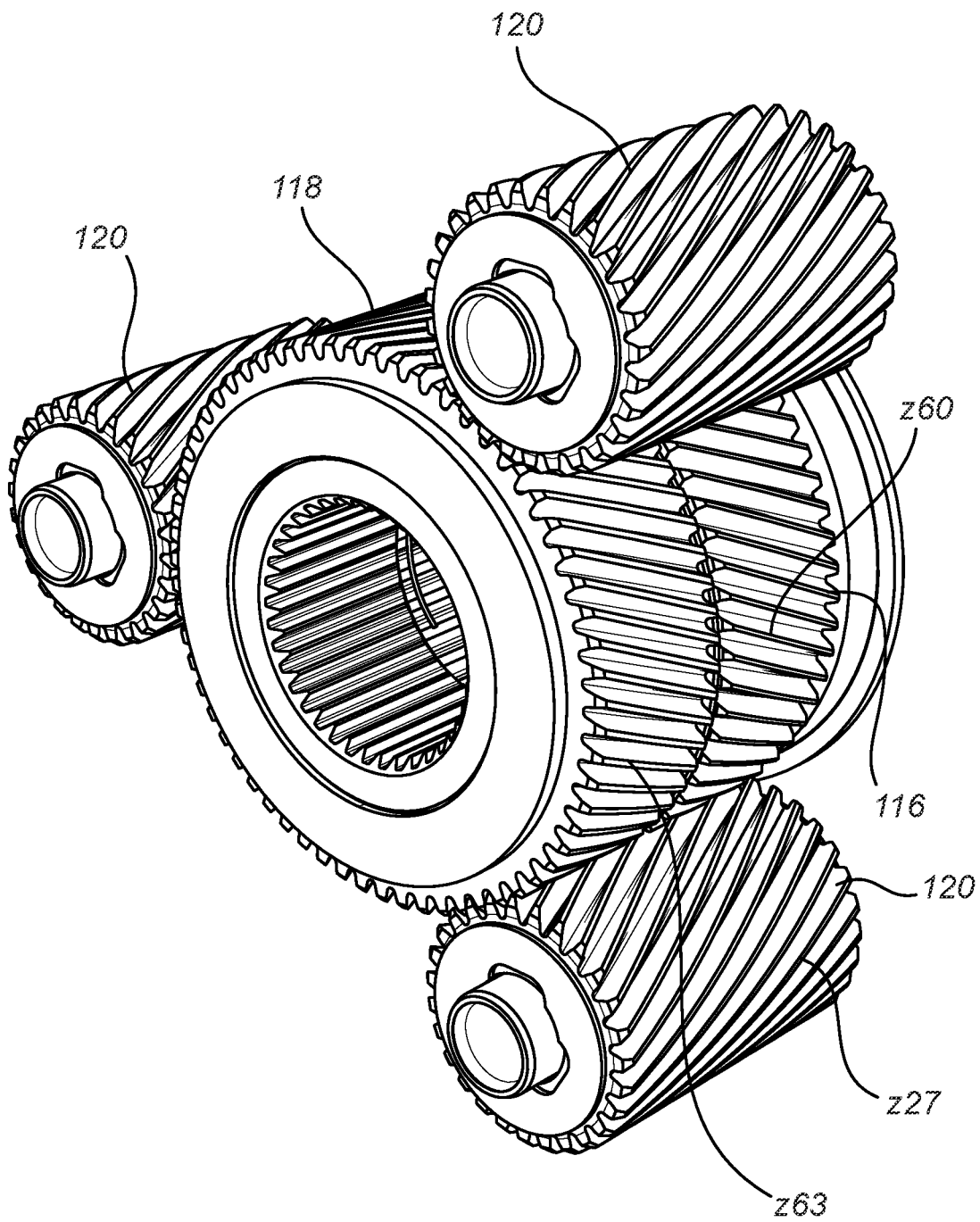
FIG. 2 is a schematic illustration of parts of an epicyclic planetary gear in a transmission arrangement according to an embodiment of the disclosure.

The first and second sun gears 116, 118 and the planet gears 120 are illustrated in further detail in FIG. 2, showing an example embodiment where the coupled epicyclic gear 110 includes three planets 120. Here, it can be seen that the first and second sun gears 116, 118 are helical gears having the same helix angle and the same helix direction, i.e. the helix of both sun gears 116, 118 are of the same hand (right-hand or left-hand). It can also be seen that each planet gear 120 is a helical planet gear consisting of a single uniform gear element having a width substantially equal to the combined width of the first and second sun gears 116, 118. Moreover, that the planet gear 120 has a uniform tooth profile means that the teeth have the same profile for the full width of the planet gear 120.

The number of teeth of the first sun gear 116 is lower than the number of teeth of the second sun gear. Moreover, the gear with the lower number of teeth has a smaller reference diameter as well as a smaller base diameter. The difference in the number of teeth is a number equal to a multiple of the number of planet gears. Accordingly, for the present example using three planet gears 120 (n=3), the difference in the number of teeth between the first and second sun gear 116, 118 is equal to n×3 where n=1 in the illustrated example. More specifically, the illustrated first sun gear 116 has 60 teeth and the second sun gear 118 has 63 teeth, while the planet gear has 27 teeth. However, the number of teeth of the gear may vary as long as the planet gear is big enough to accommodate the required shaft.

When designing the coupled epicyclic gear 110 and there is a trade-off between gear ratio on one hand and mechanical reliability on the other when selecting the number of teeth of the gears and the relation in the number of teeth between the first and second sun gear, where a smaller difference offers a higher gear ratio but a lower module, also meaning a lower mechanical reliability, when compared to a larger difference in number of teeth. In the present example, the coupled epicyclic gear is preferably configured to have a gear ratio in the range of 1:10 to 1:40, and a high gear ratio is desirable to enable a physically small second machine.

Figure 3:
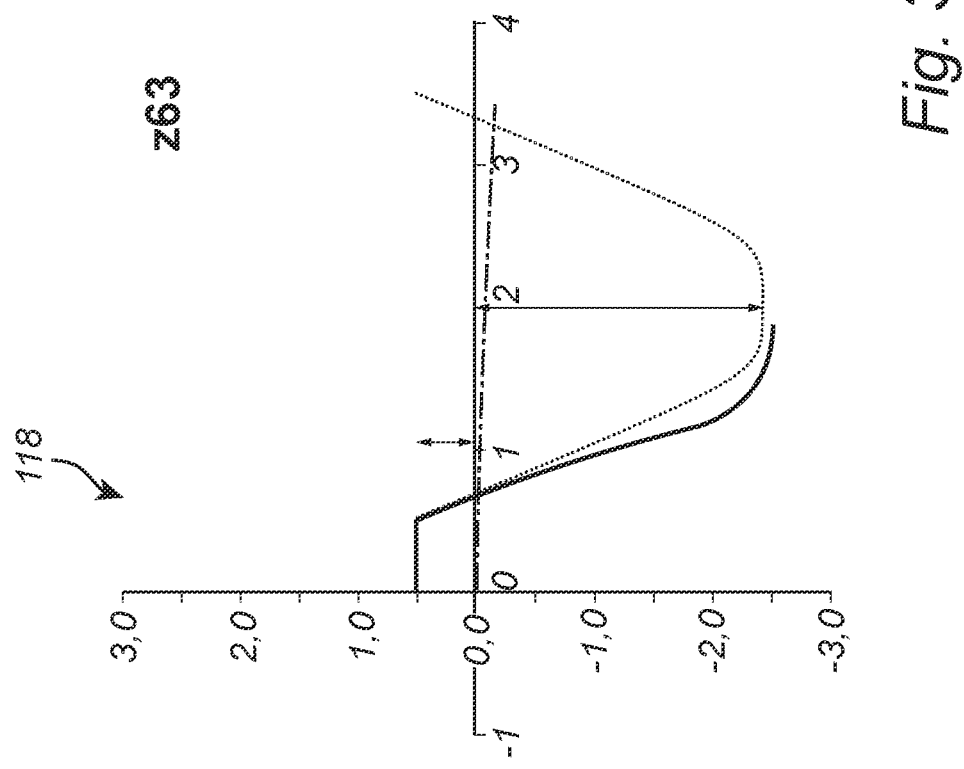
FIG. 3 is a schematic illustration of a portion of an epicyclic planetary gear in a transmission arrangement according to an embodiment of the disclosure.
Figure 3:
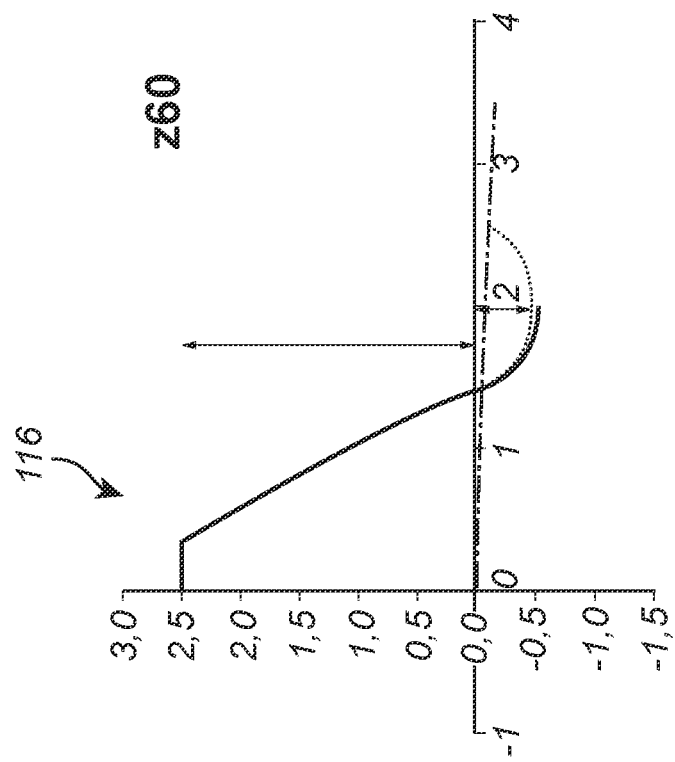

Moreover, the teeth of the first sun gear 116 are advantageously profile shifted with respect to the teeth of the second sun gear 118 to be able to commonly mesh with the planet gears. The profile shift means that the profile of teeth of the first sun gear 116 is different compared to the profile of teeth of the second sun gear 118. It can be assumed that all of the teeth of one gear have the same profile. The profile shift may for example be a shift in addendum such that the teeth of the first sun gear 116 have an addendum which is different from an addendum of the teeth of the second sun gear 118 as illustrated by FIG. 3. In FIG. 3, the addendum and dedendum for the first sun gear 116 is approximately 2.5 and 0.5, respectively, whereas the addendum and dedendum for the second sun gear 118 is approximately 0.5 and 2.5, respectively. Accordingly, in the present example, the addendum and dedendum is practically reversed for the second sun gear 118 in comparison with the first sun gear 116. A profile shift may thus mean that the teeth of the first sun gear 116 have a deeper profile compared to the teeth of the second sun gear 118. However, the module and angle of the gears are the same for the first sun gear 116 as for the second sun gear 118.

Turning to the overall functionality of the transmission arrangement, the second electric machine 112 is preferably smaller than the first electric machine 104. The first electric machine 104 is thus used as the primary motor for providing propulsive power to the wheels while the second electrical machine can be used for torque vectoring.

In the illustrated example, the second electric machine 112 is axially offset from the coupled epicyclic gear 120 and also from the first electric machine 104 and the differential 102. However, the drive module may equally well be configured to use a coaxially arranged second electrical machine where the second electrical machine 112 may have a hollow axle and be arranged on the first driveshaft 106.

Even though the disclosure has been described with reference to specific exemplifying embodiments thereof, many different alterations, modifications and the like will become apparent for those skilled in the art. Also, it should be noted that parts of the system may be omitted, interchanged or arranged in various ways, the transmission arrangement yet being able to perform the functionality of the present disclosure.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A transmission arrangement for an electric vehicle, comprising:
    a differential configured to connect a first electric machine to a first and second wheel via a respective first and second driveshaft; and
    a coupled epicyclic gear configured to connect a second electric machine to the first drive shaft via the coupled epicyclic gear, wherein the coupled epicyclic gear comprises:
        a planet carrier configured to be operatively connected to the second electric machine;
        a first sun gear comprising teeth having a first profile;
        a second sun gear comprising teeth having a second profile different from the first profile, and wherein the number of teeth of the first sun gear is different from the number of teeth of the second sun gear; and
        at least one planet gear having a uniform tooth profile, wherein the planet gear is arranged and configured to simultaneously mesh with the first and the second sun gear.

2. The transmission arrangement according to claim 1, wherein the at least one planet gear consists of a single uniform gear element.

3. The transmission arrangement according to claim 1, wherein the first and second sun gears are helical gears having the same helix angle and the same helix direction.

4. The transmission arrangement according to claim 1, wherein the number of teeth of the first sun gear is smaller than the number of teeth of the second sun gear.

5. The transmission arrangement according to claim 1, wherein the number of teeth of the first sun gear is smaller than the number of teeth of the second sun gear by a number equal to a multiple of the number of planet gears.

6. The transmission arrangement according to claim 1, wherein the teeth of the first sun gear are profile shifted with respect to the teeth of the second sun gear.

7. The transmission arrangement according to claim 1, wherein the teeth of the first sun gear have an addendum which is different from an addendum of the teeth of the second sun gear.

8. The transmission arrangement according to claim 1, wherein the teeth of the first sun gear have a deeper profile compared to the teeth of the second sun gear.

9. The transmission arrangement according to claim 1, wherein the differential comprises:
    a first differential output;
    a second differential output;
    a differential housing; and
    a differential gear set arranged in the differential housing.

10. The transmission arrangement according to claim 1, wherein the first sun gear is connected to the first drive shaft and wherein the second sun gear is connected to the differential housing.

11. The transmission arrangement according to claim 1, wherein the coupled epicyclic gear is configured to have a gear ratio in the range of 1:10 to 1:40.

12. The transmission arrangement according to claim 1, further comprising a first electric machine connected to the differential and a second electric machine connected to the coupled epicyclic gear.

13. The transmission arrangement according to claim 12, wherein the second electric machine is smaller than the first electric machine.

14. The transmission arrangement according to claim 12, wherein the second electric machine is axially offset from the epicyclic gear.

15. The transmission arrangement according to claim 12, wherein the second electric machine is arranged coaxially with the epicyclic gear.

* * * * *